(12) United States Patent
Yoon

(10) Patent No.: US 11,290,279 B2
(45) Date of Patent: Mar. 29, 2022

(54) AUTHENTICATION TERMINAL, AUTHENTICATION DEVICE AND AUTHENTICATION METHOD AND SYSTEM USING AUTHENTICATION TERMINAL AND AUTHENTICATION DEVICE

(71) Applicant: Tae Sik Yoon, Yongin-si (KR)

(72) Inventor: Tae Sik Yoon, Yongin-si (KR)

( * ) Notice: Subject to any disclaimer, the term of this patent is extended or adjusted under 35 U.S.C. 154(b) by 148 days.

(21) Appl. No.: 16/641,000

(22) PCT Filed: Aug. 22, 2018

(86) PCT No.: PCT/KR2018/009667
§ 371 (c)(1),
(2) Date: Feb. 21, 2020

(87) PCT Pub. No.: WO2019/039865
PCT Pub. Date: Feb. 28, 2019

(65) Prior Publication Data
US 2020/0382307 A1 Dec. 3, 2020

(30) Foreign Application Priority Data
Aug. 23, 2017 (KR) .......................... 10-2017-0106614

(51) Int. Cl.
*H04L 9/32* (2006.01)
*H04L 9/08* (2006.01)
*H04L 9/30* (2006.01)

(52) U.S. Cl.
CPC .......... *H04L 9/3231* (2013.01); *H04L 9/0869* (2013.01); *H04L 9/30* (2013.01)

(58) Field of Classification Search
CPC ....... H04L 9/3231; H04L 9/0869; H04L 9/30; H04L 2209/80; H04L 9/0841; H04L 9/0861; H04L 9/3271; H04L 29/06; H04L 63/0853; H04L 63/0861; G06Q 20/401; H04W 12/06; G06F 21/35; G06F 21/32
USPC .... 713/168, 169, 170, 155, 156, 161; 726/2, 726/4, 5, 6, 17, 18, 19
See application file for complete search history.

(56) References Cited

U.S. PATENT DOCUMENTS

| 2007/0192841 A1 | 8/2007 | Kim | |
| 2009/0235074 A1* | 9/2009 | Salgarelli | G06F 21/34 |
| | | | 713/169 |
| 2014/0040133 A1 | 2/2014 | Ra-Woon et al. | |
| 2014/0156531 A1* | 6/2014 | Poon | G06Q 20/027 |
| | | | 705/44 |

(Continued)

FOREIGN PATENT DOCUMENTS

| CN | 105959287 A | 9/2016 |
| JP | 2008-009600 A | 1/2008 |
| KR | 10-2011-0002968 A | 1/2011 |

(Continued)

*Primary Examiner* — Izunna Okeke
(74) *Attorney, Agent, or Firm* — Novick, Kim & Lee, PLLC; Jae Youn Kim; Jihun Kim

(57) ABSTRACT

The present disclosure relates to an authentication terminal, an authentication device, and an authentication method and system using the authentication terminal and the authentication device, and more particularly, to a device and a method for authenticating users and allowing transactions through information delivery among a user terminal, an authentication terminal, and an authentication device.

18 Claims, 7 Drawing Sheets

(56) References Cited

U.S. PATENT DOCUMENTS

2016/0065370 A1 3/2016 James et al.
2016/0125416 A1 5/2016 Canfield et al.

FOREIGN PATENT DOCUMENTS

| KR | 10-2012-0024302 A | 3/2012 |
| KR | 10-2015-0135717 A | 12/2015 |
| KR | 10-1595099 B1 | 2/2016 |
| KR | 2016-0042286 A | 4/2016 |
| KR | 2016-0142032 A | 12/2016 |
| KR | 2017-0067239 A | 6/2017 |
| WO | 2017/197974 A1 | 11/2017 |

* cited by examiner

AUTHENTICATION TERMINAL, AUTHENTICATION DEVICE AND AUTHENTICATION METHOD AND SYSTEM USING AUTHENTICATION TERMINAL AND AUTHENTICATION DEVICE

TECHNICAL FIELD

The present disclosure relates to an authentication terminal, an authentication device, and an authentication method and system using the authentication terminal and the authentication device, and more particularly, to a device and a method for authenticating users and allowing transactions through information delivery among a user terminal, an authentication terminal, and an authentication device.

DISCUSSION OF RELATED ART

Recently, financial transaction service methods using a portable personal wireless communication device, for example, an authentication method using a portable personal wireless communication device, have been developed, and the use of portable personal wireless communication devices has increased significantly due to the development of wireless Internet technology. Accordingly, it is said that the importance of security and authentication of portable personal wireless communication devices becomes much greater than the case where they are used for simple communication as in the past.

On the other hand, until recently, the user authentication method in the financial transaction service confirms the identity of a user when the user inputs the ID and password correctly, thus providing the user with the Internet financial services. However, the reliability of this method is rather low, so financial transactions such as transfers are limited for such a case.

Accordingly, if a user wants to use financial transaction services such as transfers, there requires an authentication process in which a user obtains a certificate, which may be a resident card on the Internet, from the Korea Financial Telecommunications and Clearings Institute, registers the certificate on a site of a financial service agency, and enters the password to digitally sign, thus verifying the identity.

However, the above-described conventional authentication process is a method of verifying the identity of the user by inputting the password of the certificate, and since the certificate may be copied from a medium containing the certificate, there is a high possibility of being hacked if only the password is exposed.

Accordingly, financial agencies employ methods for lowering the possibility of being hacked, that is, provide users with additional authentication means for important services such as money transfers, for example, double-authentication of entering a security card number or one-time password (OTP) number or telephone authentication after the user inputs the account password on a transfer screen. However, there is an issue that the responsibility for authentication-related information leakage is passed on to the user. In addition, if an OTP device is lost, an accident may occur, and authentication-related information such as a certificate stored in a user's portable storage device or a computer hard disk has a high risk of hacking.

In addition, there is a problem that the user is not provided with a quick authentication process, so it might be greatly time consuming and cumbersome.

In the present disclosure, in order to solve the above problems, authentication is performed using an elliptic curve cryptography (ECC). ECC is one of public key cryptography methods based on the elliptic curve theory, and it has the advantage of providing a similar level of safety, while using a key shorter than Rivest-Shamir-Adleman (RSA) or Elgamal.

Based on such advantages, ECC is mainly used in a constraint environment with limited amount of transmission and computation, such as wireless environment. In ECC, the cryptography is designed based mainly on the elliptic curve discrete algebra problem.

An encryption system using an ECC algorithm proceeds in a sequence that it shares, with each terminal, a public key obtained by combination with a random number and synchronizes each terminal with a secret key that cannot be inferred by an attacker.

In order to implement such an encryption system, a key distribution algorithm and a message encryption algorithm need to be configured. A representative example of an elliptic curve encryption-based key distribution scheme is an elliptic curve Diffie-Hellman (ECDH) algorithm.

Technical Objectives

Aspects of embodiments of the present disclosure are directed to an authentication terminal and an authentication device that may substantially minimize the risk of getting personal information or authentication-related information being hacked, by using an elliptic curve Diffie-Hellman (ECDH) algorithm based on the elliptic curve cryptography (ECC) algorithm, and to an authentication method and an authentication system using the same.

Aspects of embodiments of the present disclosure are also directed to an authentication terminal and an authentication device that may secure stability more than the transaction server even if personal information is exposed from an authentication server, and to an authentication method and an authentication system using the same.

Aspects of embodiments of the present disclosure are also directed to an authentication terminal and an authentication device that may extract the activity level of changing movement of sweat glands in the shape of user's fingerprint ridges to use it as a user authentication means that may not be duplicated and eliminate the hassle of the authentication process, and to an authentication method and an authentication system using the same.

Aspects of embodiments of the present disclosure are also directed to an authentication method and an authentication system that may overcome the weaknesses in a conventional authentication process in which guessing of the user's ID or password is possible based on the user's personal information, communication values or values stored on the server, may secure the safety against guessing attacks on key values of user's personal identification information, and may eliminate the hassle of authentication procedures, in user authentication processes in a variety of environments such as cloud system, control system, Internet of Things (IOT) and a smart card.

Technical Solution to the Problem

According to an embodiment, an authentication system includes a user terminal configured to request a transaction by transmitting user information; a transaction server configured to receive the transaction request, generate an authentication code, and request authentication for the user; an authentication terminal configured to generate a modified authentication code based on the authentication code, generates a modified verification code based on a verification code, and transmit the modified verification code to the transaction server; and an authentication engine configured to receive the modified authentication code to verify legitimacy of the authentication terminal, generate the verification code, and transmit the verification code to the authentication terminal. The transaction server authenticates the transaction by determining whether a result of calculating the modified verification code matches the authentication code generated by the transaction server.

The user terminal may transmit a message including a transaction type and a telephone number of the user to the transaction server.

The transaction server may select a random number, generate a public key using the random number, generate the authentication code using the user information, and transmit the generated public key and the authentication code to the authentication terminal.

The authentication terminal may generate an authentication code using the user information, and determine whether the authentication code matches the authentication code received from the transaction server.

The authentication terminal may select a random number, generate a public key using the random number, generate the modified authentication code using the user information, biometric information, and activity level, and transmit the generated public key and the modified authentication code to the authentication engine.

The authentication engine may generate an authentication code using the user information, biometric information, and activity level, and determine whether the authentication code matches the authentication code received from the authentication terminal.

The authentication engine may store a normal fingerprint and an emergency fingerprint.

The authentication engine may select a random number, generate a public key using the selected random number, generate a shared secret key using the random number and the public key received from the authentication terminal, generate a verification code using the shared secret key and the user information, and transmit the generated public key and the verification code to the authentication terminal.

The authentication terminal may generate a shared secret key using the public key received from the authentication engine and determine whether a result of calculation between the generated shared secret key and the verification code received from the authentication engine matches the verification code generated by using the user information.

The authentication terminal may generate a shared secret key using the random number generated by the authentication terminal and the public key received from the transaction server, generate a modified verification code using the generated shared secret key, and transmit the public key and the modified verification code generated by the authentication terminal to the transaction server.

The transaction server may generate a shared secret key using the random number generated by the transaction server and the public key received from the authentication terminal, and determine whether a result of calculation between the generated shared secret key and the modified verification code received from the authentication terminal matches the verification code generated using the user information.

According to an embodiment, an authentication method includes a user terminal requesting a transaction by transmitting user information; a transaction server receiving the transaction request and generating an authentication code; an authentication terminal verifying legitimacy of the transaction server and generating a modified authentication code based on the authentication code; an authentication engine verifying legitimacy of the authentication terminal, generating a verification code based on the modified authentication code, and transmitting the verification code to the authentication terminal; the authentication terminal generating a modified verification code based on the verification code and transmitting the modified verification code to the transaction server; and the transaction server authenticating the transaction by determining whether a calculation result of the modified verification code matches the authentication code generated by the transaction server.

The user terminal may transmit a message comprising a transaction type and a telephone number of the user to the transaction server.

The transaction server may select a random number, generate a public key using the random number, generate the authentication code using the user information, and transmit the generated public key and the authentication code to the authentication terminal.

The authentication terminal may generate an authentication code using the user information, and determine whether the authentication code matches the authentication code received from the transaction server.

The authentication terminal may select a random number, generates a public key using the random number, generate the modified authentication code using the user information, biometric information, and activity level, and transmit the generated public key and the modified authentication code to the authentication engine.

The authentication engine may store a normal fingerprint and an emergency fingerprint.

The authentication engine may generate an authentication code using the user information, and determine whether the authentication code matches the authentication code received from the authentication terminal.

The authentication engine may select a random number, generates a public key using the selected random number, generate a shared secret key using the random number and the public key received from the authentication terminal, generate a verification code using the shared secret key and the user information, and transmit the generated public key and the verification code to the authentication terminal.

The authentication terminal may generate a shared secret key using the public key received from the authentication engine and determine whether a result of calculation between the generated shared secret key and the verification code received from the authentication engine matches the verification code generated by using the user information.

The authentication terminal may generate a shared secret key using the random number generated by the authentication terminal and the public key received from the transaction server, generate a modified verification code using the generated shared secret key, and transmit the public key and the modified verification code generated by the authentication terminal to the transaction server.

The transaction server may generate a shared secret key using the random number generated by the transaction server and the public key received from the authentication terminal, and determine whether a result of calculation between the generated shared secret key and the modified verification code received from the authentication terminal matches the verification code generated using the user information.

Effects of the Invention

The authentication method according to at least some embodiments of the present disclosure is fast because there is no digital signature encryption process, and it may be used by anyone by replacing a password with a fingerprint one-touch.

Further, the authentication method according to at least some embodiments of the present disclosure is safe from the risk of information leakage since personal information or authentication-related information is stored only in an authentication terminal. In addition, the authentication process is transparent without the input of an individual user. In addition, since the fingerprint or biometric information directly collected by the user is used, verification of the user identity is 100% guaranteed.

Further, in the authentication method according to at least some embodiments of the present disclosure, since personal information or authentication-related information is stored only in an authentication terminal, the risk of personal information exposure or hacking is low.

Further, the authentication method according to at least some embodiments of the present disclosure may ensure much more stability because the possibility of customer information exposure is lower than that of a conventional transaction server.

In addition, the authentication method according to at least some embodiments of the present disclosure may speed up the user verification process since an authentication terminal may receive a verification code asynchronously from an authentication engine and immediately respond to the authentication request

PREFERRED EMBODIMENTS OF THE INVENTION

Hereinafter, an authentication terminal, an authentication server and an authentication method using the authentication terminal and the authentication server according to an embodiment of the present disclosure will be described in detail with reference to the drawings. Advantages, features and methods for achieving them of the present disclosure will be apparent, referring to the embodiments described in detail below with the accompanying drawings.

However, the present disclosure is not limited to the embodiments disclosed below, but may be implemented in various forms, and the embodiments are provided only to make the disclosure complete and to fully inform the person having common knowledge in the pertinent art. It is to be understood that the present disclosure is only to be defined by the scope of the claims.

Figure 1:
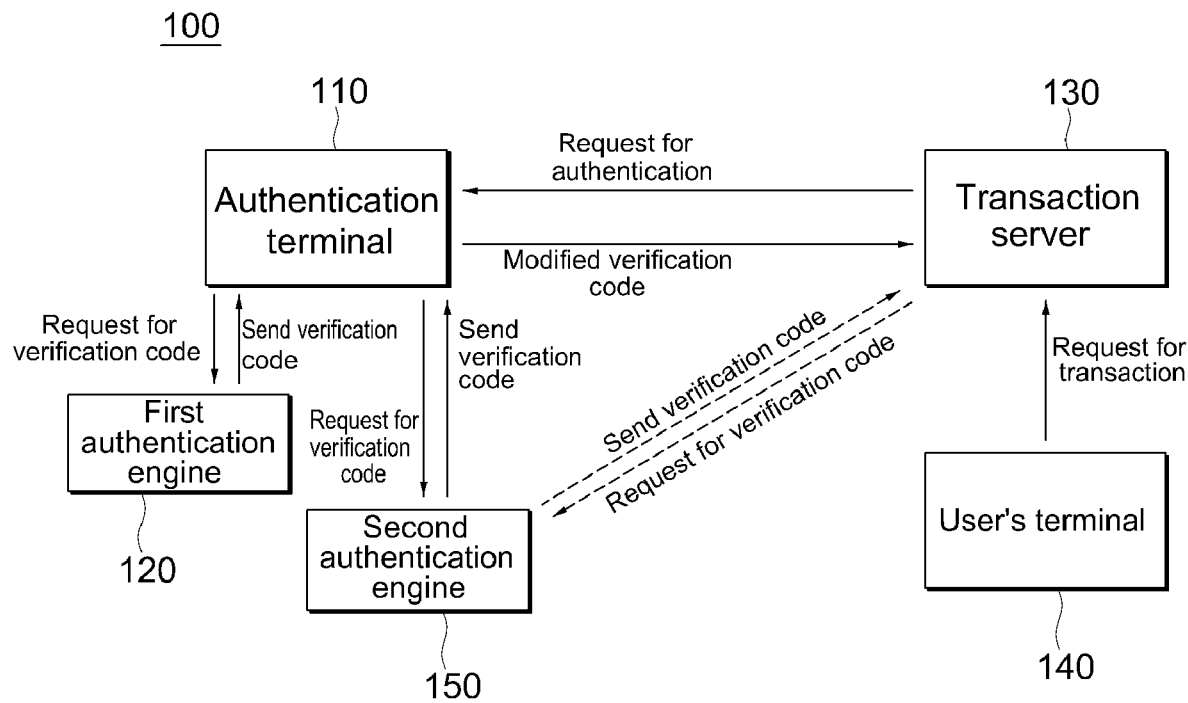
FIG. 1 is a conceptual diagram schematically illustrating an overall configuration of an authentication system according to an embodiment of the present disclosure

FIG. 1 is a conceptual diagram schematically illustrating an overall configuration of an authentication system according to an embodiment of the present disclosure.

Referring to FIG. 1, an authentication system 100 according to an embodiment of the present disclosure includes an authentication terminal 110, a first authentication engine 120, and a transaction server 130. In addition, the authentication system 100 according to an embodiment of the present disclosure may further include a user terminal 140 and a second authentication engine 150.

The user terminal 140, which is a terminal for accessing the transaction server 130 to conduct financial transactions, may include a personal computer (PC), a smartphone, a tab, a pad, or all kinds of terminals capable of conducting financial transactions by accessing the transaction server 130 wirelessly or by wire.

The user terminal 140 accesses the transaction server 130 and requests a transaction, using an application installed on the user terminal 140 or a web page provided by the transaction server 130.

The transaction server 130 receives an access request from the user terminal 140 and provides the user terminal 140 with a screen for the user terminal 140 to conduct a transaction.

The user terminal 140 may perform transactions such as viewing transaction details, viewing loans, transfer, loan repayment, etc. by using the application installed on the user terminal 140 or the web page provided by the transaction server 130.

The transaction server 130 should be installed with an authentication application to perform the authentication method according to an embodiment of the present disclosure. The transaction server 130 in which the authentication application is installed may perform an authentication process through data communication with the authentication terminal 110 and the second authentication engine 150.

When the transaction server 130 installed with the authentication application receives a transaction request from the user terminal 140, it may request the authentication terminal 110, other than the user terminal 140 accessing the transaction server 130, for user authentication. The user may allow the user's fingerprint information to be recognized through the authentication terminal 110, thereby authenticating the transaction requester who accesses the transaction server.

The authentication terminal 110 is installed with a separate application for user authentication.

The authentication terminal 110 is paired with the user terminal 140 to enable Bluetooth communication.

In addition, the authentication terminal 110 may be the same device as the user terminal 140. In such a case, the authentication terminal 110 accesses the transaction server 130 to perform a financial transaction, in addition to its function of the authentication terminal 110.

The authentication terminal 110 receives the authentication request from the transaction server 130 and requests verification by requesting a verification code from the first authentication engine 120.

The first authentication engine 120 may be installed in a smart watch worn by a user. In addition, the second authentication engine 150 may be installed in a server or a cloud.

One of the first authentication engine 120 and the second authentication engine 150 transmits the verification code to the authentication terminal 110, and the authentication terminal 110 having received the verification code modifies the verification code and then transmits the modified verification code to the transaction server 130.

An authentication system according to an embodiment of the present disclosure may include at least one of the first authentication engine 120 and the second authentication engine 150, and the first authentication engine 120 may be the same as the second authentication engine 150. In a case where the first authentication engine 120 is lost or the first authentication engine 150 is not available, the second engine 150 backed up to the server or the cloud may be used as the authentication engine.

The transaction server 130 performs the transaction requested by the user after verifying the identity of the user who requested the transaction by using the modified verification code.

In an embodiment, if the user does not have the first authentication engine 120 and the authentication terminal 110, the transaction server 130 may directly request the second authentication engine 150 for the verification code, and the second authentication engine 150 may send the verification code to the transaction server 130.

As used herein, authentication refers to a process before checking the legitimacy of the user and the terminal, from the transaction server 130 to the authentication engine 125 and 150 via the authentication terminal 110, and verification refers to a process after checking the legitimacy of the user and the terminal, from authentication engine 125 and 150 to the transaction server 130 via the authentication terminal 110.

In addition, the authentication information and the verification information in each process may be modified for each process but may include the same information.

Figure 2:
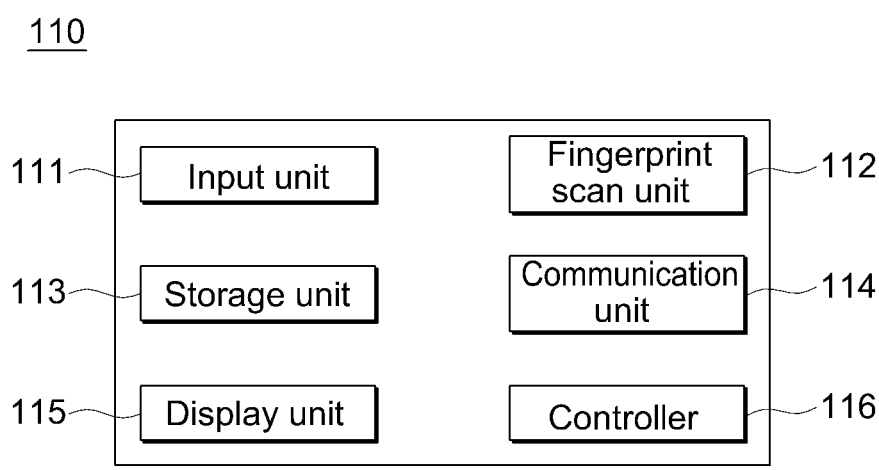
FIG. 2 is a block diagram schematically illustrating a configuration of an authentication terminal according to an embodiment of the present disclosure.
Figure 3:
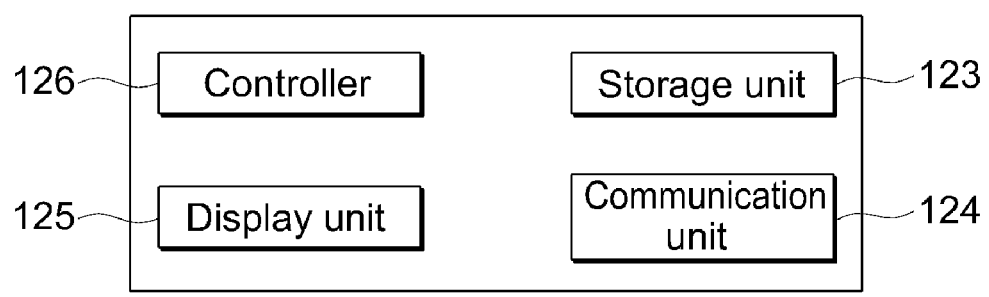
FIGS. 3 and 4 are block diagrams schematically illustrating a configuration of an authentication engine according to an embodiment of the present disclosure.
Figure 4:
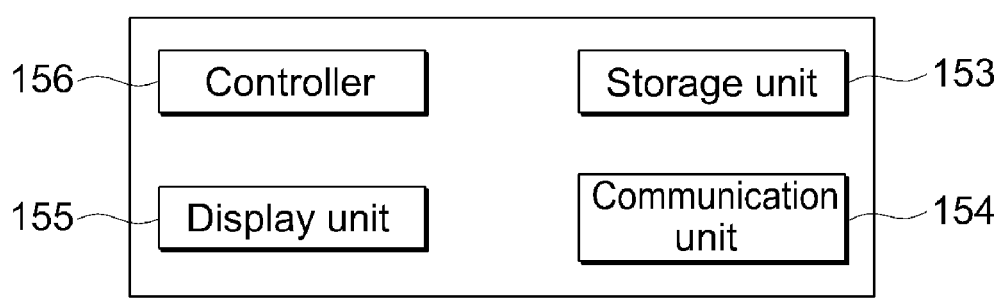

FIG. 2 is a block diagram schematically illustrating a configuration of an authentication terminal 110 according to an embodiment of the present disclosure, and FIGS. 3 and 4 are block diagrams schematically illustrating a configuration of authentication engines 120 and 150 according to an embodiment of the present disclosure.

Referring to FIGS. 1 to 4, the authentication terminal 110 according to an embodiment of the present disclosure includes an input unit 111, a fingerprint scan unit 112, a storage unit 113, a communication unit 114, a display unit 115, and a controller 116. The first authentication engine 120 includes a controller 126, a storage unit 123, a display unit 125, and a communication unit 124.

In addition, the second authentication engine 150 includes a controller 156, a storage unit 153, a display unit 155, and a communication unit 154.

The authentication terminal 110 authenticates the user by recognizing fingerprint information of the user. In the conventional fingerprint recognition method, after fingerprint ridges of the user are scanned and stored into an image, a fingerprint of a user is scanned every time the authentication is performed, and the identity of the user is verified according to the result of comparison between the scanned fingerprint image of the user and the stored fingerprint image. Such a conventional fingerprint recognition method simply compares the fingerprint images alone, and thus if a user's fingerprint is duplicated and used, an error may occur, and it may be recognized as the user's fingerprint.

In order to solve the above-mentioned duplicate fingerprint recognition error, the present disclosure uses the fact that sweat glands are formed in the shape of fingerprint ridges, and pores are minutely breathing and moving to discharge the sweat from the sweat glands. The human body is breathing all the time through the skin, so if more than one third of a human body is burned, it may lead to death, in which case the cause of death is asphyxiation. That is, the human body should breathe not only through the nose and mouth but also through the skin.

Accordingly, in the present disclosure, in order to determine whether the fingerprint is a duplicated one, a method of extracting, into an electric signal of a semiconductor chip, the changing movement of the sweat glands in the shape of fingerprint ridges, that is, the activity level of breathing through the skin and releasing sweat, may be used in addition to a method of comparing fingerprint images in the authentication process, such that a duplicate fingerprint and a biometric fingerprint may be distinguished. Accordingly, the present disclosure may distinguish voluntary authentication from authentication by duplication of fingerprints.

In addition, the user may register a normal fingerprint used for a normal transaction and an emergency fingerprint used in an emergency situation in at least one of the first authentication engine 120 and the second authentication engine 150. For example, a fingerprint of a thumb may be registered as a normal fingerprint used in a normal transaction, and a fingerprint of an index finger may be registered as an emergency fingerprint used in an emergency. Accordingly, in a case where a user is kidnapped and needs to authenticate without the user's own will, the user may use the fingerprint for the emergency so that emergency actions, for example, reporting to the police or police dispatch, may be taken.

When the user operates the input unit 111 of the authentication terminal 110 to switch to the mode for registering the fingerprint, and then touches the fingerprint scan unit 112 with a bottom surface of a finger with the fingerprint, the fingerprint scan unit 112 scans the fingerprint of the user and converts them into corresponding fingerprint data.

The converted fingerprint data is input from the fingerprint scan unit 112 to the controller 116 and then recorded in the storage unit 113 by the controller 116, and thus the user's fingerprint is registered. In order to prevent the fingerprint data leakage that may occur when the authentication terminal 110 is lost, the fingerprint data is encrypted and stored in the storage units 123 and 153 of the authentication engines 120 and 150 at a time, and the user directly manages the user's fingerprint information.

In an embodiment, an algorithm suitable for the capacity or performance of the authentication terminal 110 to be used may be selected as an encryption algorithm used to encrypt the fingerprint data. When the fingerprint data is stored in the second authentication engine 150, the fingerprint data may be transmitted through a secure communication channel to which TLS, SSL, or DTLS is applied.

When the user conducts a financial transaction, the user contacts the fingerprint scan unit 112 with the bottom surface of the finger with the fingerprint, and the fingerprint scan unit 112 scans the user's fingerprint and converts them into corresponding fingerprint data. The fingerprint data converted by the fingerprint scan unit 112 is input to the controller 116.

In such a case, the controller 116 compares the fingerprint data input from the fingerprint scan unit 112 with the fingerprint data stored in the storage unit 113 to determine whether a current user is the registered user. If the current user is not the registered user, the fingerprint authentication is canceled and a message notifying that fingerprint authentication is canceled is displayed through the display unit 115.

In addition, when the encrypted fingerprint information stored in the storage unit 113 is decrypted to compare the fingerprint data input from the fingerprint scan unit 112 with the fingerprint data stored in the storage unit 113, the decrypted fingerprint data is temporarily stored in a safe space and deleted at the same time that the authentication process ends.

In an embodiment, when it is determined that the user whose fingerprint has been queried is the registered user as the determination result, the controller 116 encrypts a fingerprint authentication signal indicating that the fingerprint has been authenticated, time data indicating the current time, authenticated fingerprint data, and the like in accordance with a predetermined encryption algorithm stored in the storage unit 113 and output them to the communication unit 114, and a message indicating that the fingerprint has been authenticated is displayed on the display unit 115.

If there is no key operation for a predetermined time after the fingerprint authentication is made, the previously authenticated fingerprint data is invalidated and should be re-authenticated to use the authentication terminal 110. Accordingly, problems that the fingerprint authentication is accidentally initiated, thus leaving the authentication terminal 110 untouched, may be solved.

On the other hand, in the reverse order, when the fingerprint authentication is performed after the key operation is completed, and when the data corresponding to the previous key operation is transmitted with the fingerprint authentication data, the receiving side may process all data transmitted from the authentication terminal 110.

Figure 5:
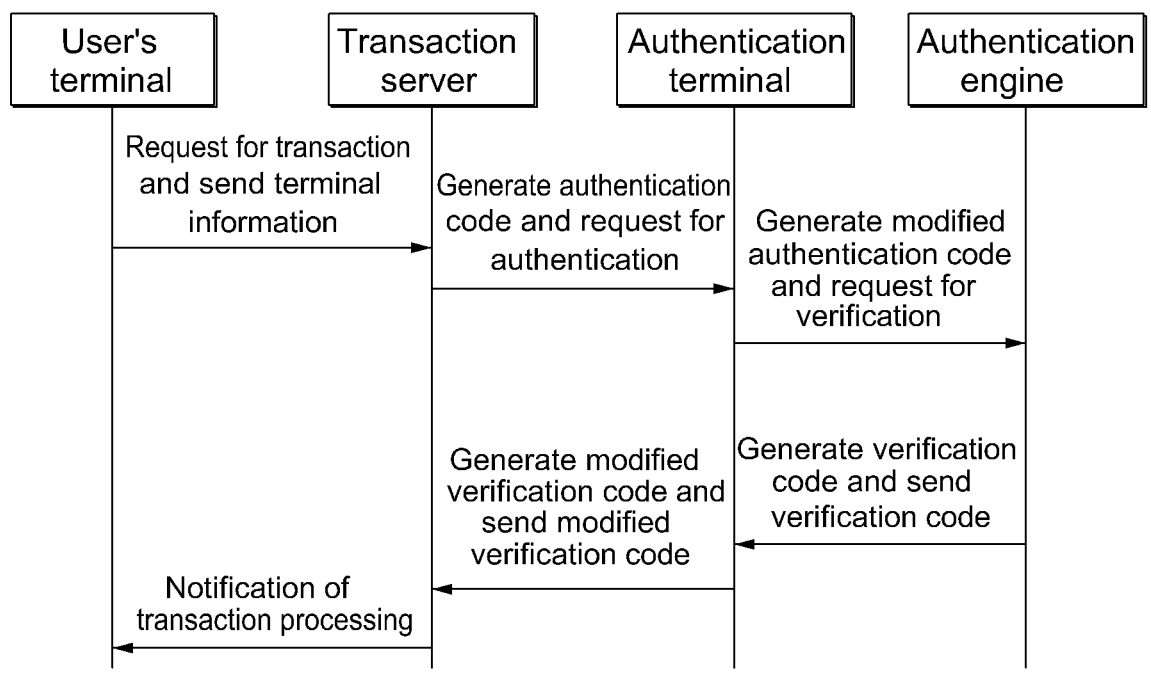
FIG. 5 is a flowchart illustrating an authentication process according to an embodiment of the present disclosure.
Figure 6:
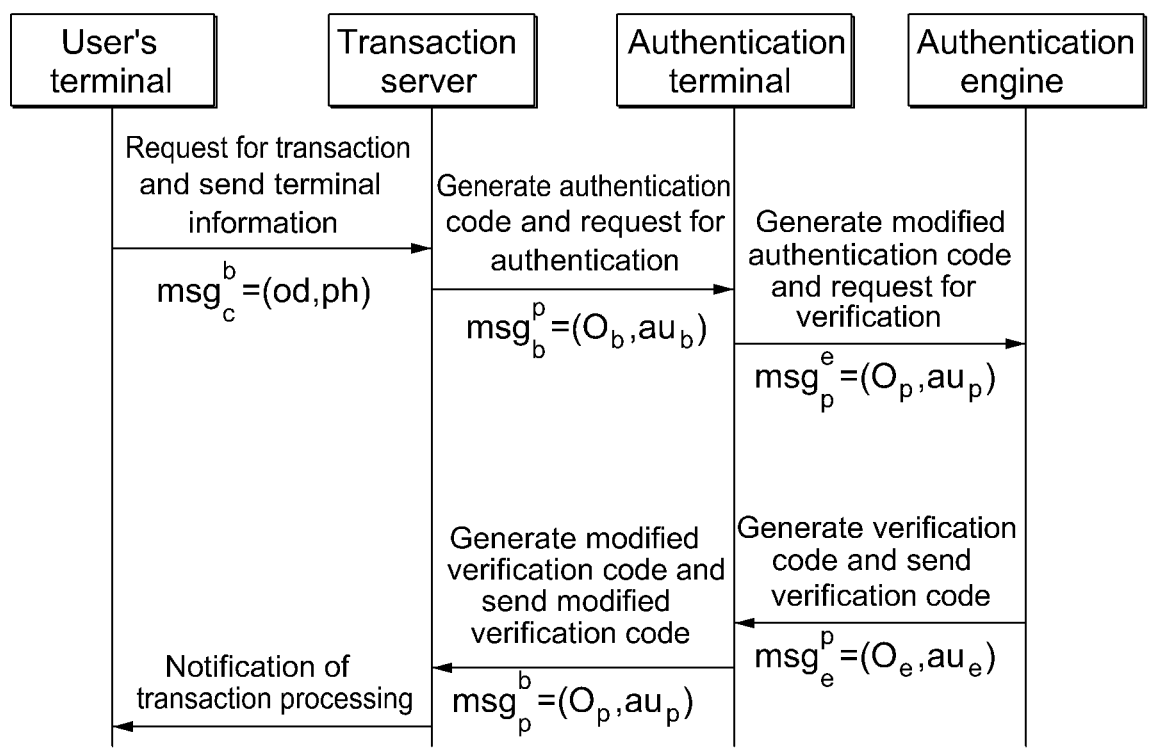
FIG. 6 is a diagram illustrating a message transfer process in authentication of FIG. 5.

FIG. 5 is a flowchart illustrating an authentication process according to an embodiment of the present disclosure. FIG. 6 is a diagram illustrating a message transfer process in authentication of FIG. 5.

In order to explain the authentication process and message transfer process of the present disclosure, each of the data used in the present disclosure will be represented by the following symbols.

ph: phone number, im: IMEI, pid: authentication engine ID od: transaction type, $msg_s^d$: message dur: time interval, $t_{now}$: current time h ( ): hash function, au: authentication code, $ve_d$: verification code $n_d$: random number, $Q_d$: public key, $K_s^d$: shared secret key Elliptic curve group: size-q (large prime), production parameter-G The subscript d represents a destination and s represents a source. P stands for phone, e stands for engine, b stands for bank, and c stands for pc. The information required for authentication is transmitted through the public key and the authentication code.

The user terminal may be any one of a user's computer (PC), a smart phone, and a tablet PC.

In addition, the user terminal may be the same device as the authentication terminal. In such a case, the user terminal performs the function of the authentication terminal at a time.

The transaction server may include a server of the bank.

1. Transaction Request and Terminal Information Transmission

User Terminal→Transaction Server

When the user terminal accessing a web of the transaction server requests the transaction server for a financial transaction, a message including transaction types, user information such as telephone number, or terminal information is sent. The message is as follows.

$msg_s^d$=(od,ph)

2. Generate a Verification Code and Request Authentication

Transaction Server

The transaction server performs an AND operation between a bit string of a current time and a time interval in which a specific part is set to zero. For example, if current time=(year, month, day, hour, minute, second, ms) and time interval=((1). (1). (1). (1). (0). (0)), the time interval means one minute. If the AND operation is performed on the current time and the time interval, (second. ms) becomes 0, and thus a value of the AND operation performed on the current time and the time interval for 1 minute is always the same value.

$t=t_{now}$*dur, where t is time.

The transaction server hashes a bit string <telephone number, im, time> to generate a transaction server_authentication code, which means an authentication code of the transaction server. As used herein, im is a symbol representing international mobile equipment identity (IMEI), which is a terminal unique serial number representing information such as the manufacturer and the model of the terminal. The IMEI may be received from the user terminal.

$au_b$=h(<ph,im,t)

The transaction server selects a random number and uses it as a private key to be stored. A public key is calculated based on the private key. The random number is generated through a random number generator (RNG), a pseudo random number generator (PRNG), or a true random number generator to be used as a private key. The public key is calculated based on the private key using an elliptic curve cryptography (ECC) algorithm. In such a case, a size of the key generated by the ECC algorithm should be at least 160 bits. The generated private key should be stored in a secure area.

$0<n_b<q, Q_b=n_bG$

Transaction server→Authentication Terminal

The transaction server sends a message including (public key, transaction server_authentication code) to request authentication and transaction for the user.

$msg_b^P$=($Q_b$,$au_b$)

3. Generate Modified Authentication Code and Request Verification

Authentication Terminal

The authentication terminal checks the legitimacy of the transaction server. The authentication terminal sets the current time by performing an AND operation with the time interval. When the authentication terminal_authentication code pre-stored in the authentication terminal and the transaction server_authentication code received from the transaction server match each other, the authentication terminal determines that the transaction server is legitimate.

$t=t_{now}$&dur, where t is time.

$au_b$=h(ph,im,t>)

If $au_p=U_b$, valid

In addition, the authentication terminal generates a modified authentication code based on the authentication code received from the transaction server. The authentication terminal generates the modified authentication code by hashing <telephone number, im, bio information, time> based on at least one of biometric information and bioactivity level extracted by a biometric means of the authentication terminal and the received authentication terminal_authentication code ($au_p$).

The biometric information may include at least one selected from the group consisting of a fingerprint, an iris, a physiological substance (e.g., sweat, saliva, urine, etc.) discharged from the human body and an indicator of human activity level.

In addition, the authentication terminal selects a random number to be stored as a private key and calculates a public key based on the random number. The random number is generated through a random number generator (RNG), a pseudo random number generator (PRNG), or a true random number generator and is used as the private key. The public key is calculated based on the private key using an elliptic curve cryptography (ECC) algorithm. In such a case, a size of the key generated by the ECC algorithm should be at least 160 bits. The generated private key should be stored in a secure area.

$au = h(<ph, im, or, ac, t>)$
$0 < n_p = q, Q_p = n_p G$

Authentication Terminal→Authentication Engine

The authentication terminal sends the modified authentication code (public key, biometric information, authentication terminal_authentication code) to the authentication engine and requests a verification code.

$msg_p^e = (Q_p, au_p)$

4. Generate Verification Code and Send Verification Code

Authentication Engine

The authentication engine checks the legitimacy of the authentication terminal. The authentication engine may set the current time by performing an AND operation with the time interval and extract biometric information included in the modified authentication code received from the authentication terminal.

The authentication engine compares the stored biometric and activity level information of the user with the biometric information received from the authentication terminal and when they match each other, the authentication engine determines that the authentication terminal is legitimate.

As another embodiment, in order to determine the legitimacy of the authentication terminal, the authentication engine may set the current time by performing an AND operation with the time interval and calculate the authentication engine_authentication code using biometric information stored in advance in the authentication engine. Next, the authentication engine may compare the calculated authentication engine_authentication code with the modified authentication terminal_authentication code received from the authentication terminal and when they match each other, the authentication engine may determine that the authentication terminal is legitimate.

$t = t_{now} \& dur$, where t is time.
$au_e = h(<ph, im, or, ac, t>)$
If $au_e = au_p$, valid In addition, the authentication engine generates a verification code to be sent to the authentication terminal based on the modified authentication code. The authentication engine selects a random number as a private key and generates a public key using the private key. In addition, the authentication engine calculates a shared secret key by multiplying the public key from the authentication terminal with the private key generated by the authentication engine. This secret key should be the same on the authentication terminal and the authentication engine. The authentication engine generates the verification code by XORing the result of hashing <phone number, im, time, authentication engine ID> and the shared secret key.

$0 < n_e < q, Q_e = n_e G, K_p^e = n_e Q_p = n_e n_p G$
$ve_e = h(<ph, im, tpid>) \oplus K_p^e$, Authentication Engine→Authentication Terminal The public key and the verification code of the authentication engine are transmitted to the authentication terminal.

$msg_e^p = (Q_e, ve_e)$

5. Generate Modified Verification Code and Send Modified Verification Code

Authentication Terminal

The authentication terminal generates a shared secret key by multiplying the public key of the authentication engine with its own private key and generates a modified verification code by XORing the verification code received from the authentication engine with the shared secret key.

The authentication terminal generates its own verification code and determines that the authentication engine is legitimate when the result of XORing the shared secret key and the verification code received from the authentication engine match the verification code generated based on the information stored in itself.

$K_e^{e'} = n_p Q_e = n_p n_e G$
$ve'_e = ve_e K_p^{e'} = h(<ph, im, t, pid>)$
$ve_p = h(<ph_p, im_p, t, pid>)$
If $ve'_e = ve_p$, OK The authentication terminal generates a modified verification code. The authentication terminal calculates a shared secret key by multiplying the public key of the transaction server with the private key of the authentication terminal. The authentication terminal generates the modified verification code, to be transmitted to the transaction server, by XORing the result of hashing <phone number, im, time, authentication engine ID> and the shared secret key.

$K_b^p = n_p Q_b = n_p n_b G$
$ve_p = h(<ph, im, t, pid>) \oplus K_b^p$

Authentication Terminal→Transaction Server

The authentication terminal sends (public key, modified verification code) to the transaction server.

$msg_p^b = (Q_p, ve_p)$

6. Notification of Transaction Processing

Transaction Server

The transaction server calculates a shared secret key by multiplying the public key received from the authentication terminal with the private key of the transaction server and compares the result of XORing the shared secret key and the modified verification code received from the authentication terminal with the result of hashing <phone number, im, time, authentication engine ID> included in the authentication code stored in the transaction server. The transaction server notifies the transaction processing if the comparison results match.

$k_p^{b'} = n_b q_p = n_b n_p G$
$ve_b = h(<ph_b, im_b, t_b, pid_b>)$
If $ve_p \oplus K_b^{p'} = ve_b$, OK The present disclosure is based on the stability of the elliptic curve Diffie-Hellman (ECDH), and the random number cannot be determined by the public key alone. The authentication method of the present disclosure may share the same secret key by exchanging public keys of both parties, and the hacker cannot find either random number by the public key alone.

Figure 7:
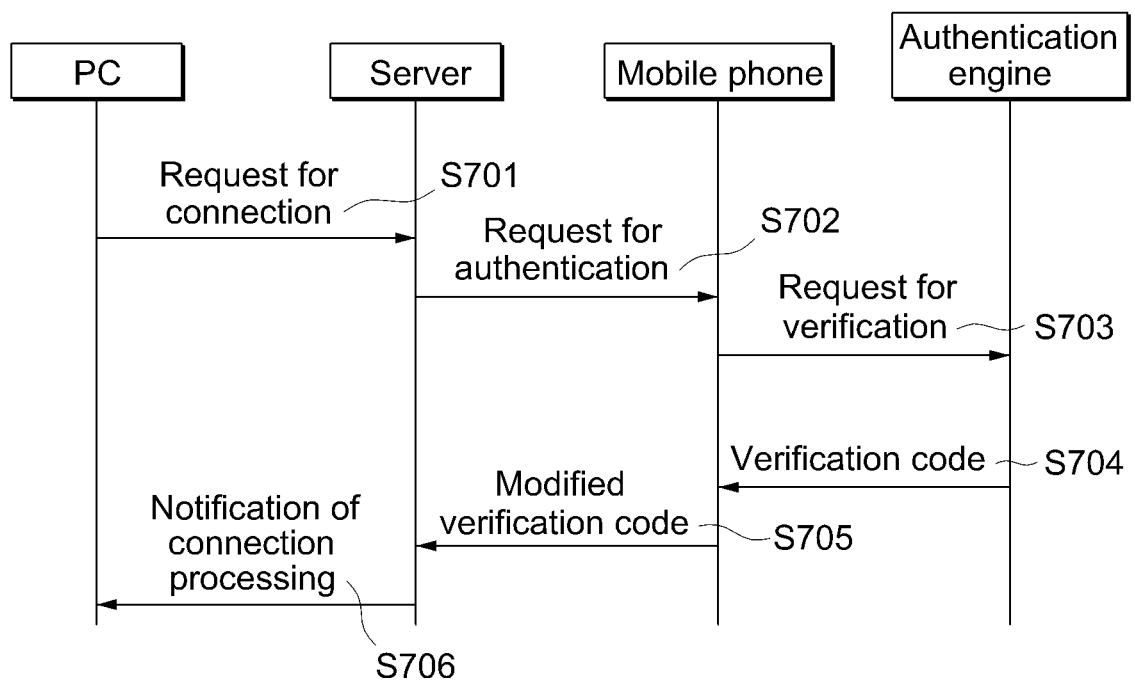
FIG. 7 is a diagram illustrating an example of performing an authentication method according to an embodiment of the present disclosure.

FIG. 7 is a diagram illustrating an example of performing an authentication method according to an embodiment of the present disclosure. The numbers described in the present embodiment are simplified and arbitrarily described to help understanding of the present disclosure.

Referring to FIG. 7, in 701, a user requests access to a server through a user's computer (PC). The server transmits a page for the user to input a mobile phone number and the user enters the mobile phone number.

In 702, the server having received the mobile number sends a randomly generated number 9 and requests the mobile phone to authenticate the user.

In 703, when the user presses an approval button, the number 9 received by the mobile phone is sent to the authentication engine to request verification.

The authentication engine requested for verification generates a random code 12345. Further, the authentication engine generates a verification code 111105 by multiplying the random code 9 received from the server with 12345 generated by the authentication engine.

In 704, the authentication engine sends the generated verification code 111105 to the mobile phone.

In 705, the mobile phone generates a modified verification code 9 by adding each digit of the verification code received from the authentication engine and sends the modified verification code 9 to the server.

In 706, the server determines whether the received modified verification code 9 and the random number 9 exported from the server match each other. Since the received modified verification code 9 and the random number 9 exported from the server match, the server notifies the user's PC that the connection is made.

In a login authentication process performing the authentication method according to an embodiment of the present disclosure, because a registering process is not necessary, there is no need to store personal information in the server, so there is no risk of personal information leakage.

In addition, since random codes are generated at all times in the server and the user side, there is no fixed number, and an anomalous random code is generated to make it difficult to leak information.

In addition, since the encryption process is omitted, it is not overloading, and all calculations are performed within 1 second.

Figure 8:
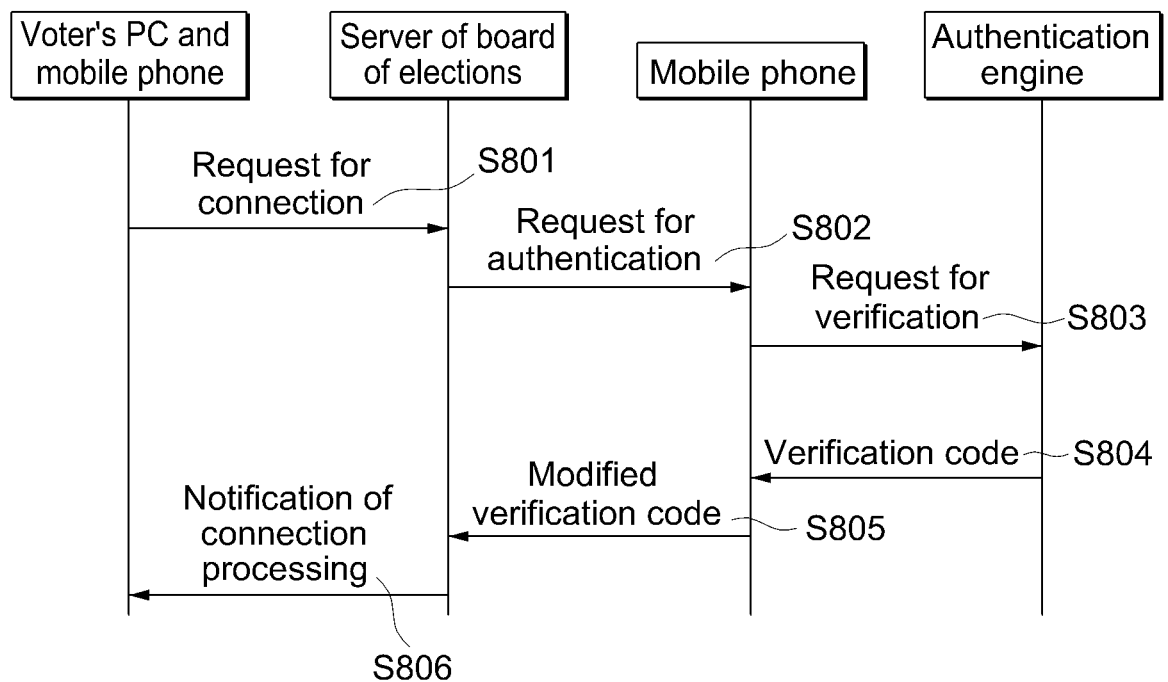
FIG. 8 is a diagram illustrating an electronic voting performing an authentication method according to an embodiment of the present disclosure.

FIG. 8 is a diagram illustrating an electronic voting performing an authentication method according to an embodiment of the present disclosure.

Referring to FIG. 8, in 801, a voter requests access by applying for an electronic vote to the election management commission through the voter's computer (PC) or mobile phone.

Upon receiving the access request in 802, the server of the election management commission sends a random number 9 for identification and an electronic voting list to the mobile phone of the voter to request authentication.

In 803, when the voter votes on one of the candidates in the electronic voting list and presses an approval button, the mobile phone sends the random number and the electronic voting result to the authentication engine and requests verification.

In 804, the authentication engine generates a random code 12345, multiplies the random number 9 received from the server of the election management commission with 12345 generated by the authentication engine, and transmits the result along with the electronic voting result to the mobile phone.

In 805, the mobile phone sums each digit of 111105 received from the authentication engine, thus generating a modified verification code 9, and transmits the result to the server of the election management commission with the electronic voting result.

In 806, the server of the election management commission compares the random number 9 sent by the server of the election management commission with the modified verification code received from the mobile phone, determines the identity of the user of the electronic voting, and stores the electronic voting result.

The electronic voting performing the authentication method according to an embodiment of the present disclosure may be managed by the server of the election management commission and may be expected to increase the turnout rate.

In addition, since random codes are used at all times, there is no risk of information leakage, no proxy voting is possible, and the encryption process is omitted, so there is no risk of server overloading, and voting information cannot be tampered with.

In addition, the electronic voting performing the authentication method according to an embodiment of the present disclosure may immediately reduce the election costs and the counting costs because the voting results immediately after the end of the voting.

Figure 9:
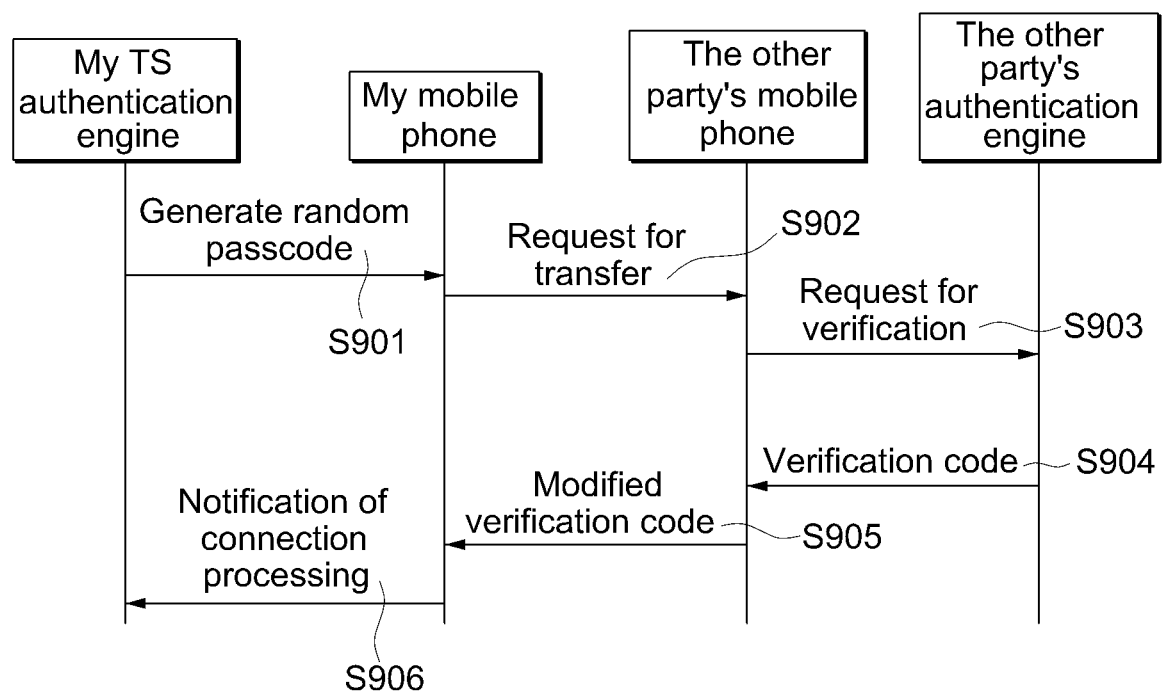
FIG. 9 is a diagram illustrating a cryptocurrency trading procedure performing an authentication method according to an embodiment of the present disclosure.

FIG. 9 is a diagram illustrating a cryptocurrency trading procedure performing an authentication method according to an embodiment of the present disclosure.

Referring to FIG. 9, in 901, the authentication engine of the user generates a random code and requests the user's mobile phone for a transfer.

In 902, when the user inputs an amount to be transferred to the user's mobile phone, the user's mobile phone generates a random number 9. The user's mobile phone sends the generated random number 9 to a mobile phone of the other party.

In 903, the other party confirms the amount to transfer and presses an approval button. The mobile phone of the other party sends the received random number and the transfer amount information to an authentication engine of the other party and requests verification.

In 904, the authentication engine of the other party generates a random code 12345. The authentication engine of the other party sends the result of multiplying the received random number 9 with 12345 generated by the authentication engine and the amount of money to transfer to the mobile phone of the other party.

In 905, the mobile phone of the other party generates a modified verification code by summing each digit of 111105 received from the authentication engine and sends the modified verification code to the mobile phone of the user.

In 906, the random number 9 initially sent and the received modified verification code 9 are compared, and the transferred electronic money is stored in the user's authentication engine.

Cryptocurrency transaction procedure for performing the authentication method according to an embodiment of the present disclosure is a private blockchain scheme with a 1:1 transfer method. Since a trader automatically generates and uses a random code, there is no risk of information leakage, and hacking is impossible. In addition, the encryption process is omitted, there is no overload, there is no possibility of tampering, and credit card merchant fees do not occur.

Although the present disclosure described above has been described with reference to the illustrated drawings, it is apparent for those in the pertinent art that the present disclosure is not limited to the described embodiments and that it can be variously modified and changed without departing from the spirit and scope of the present disclosure. Therefore, it should be understood that modifications or variations as such belong to the scope of claims of the present disclosure, and the scope of the invention should be interpreted based on the appended claims.

The invention claimed is:

1. An authentication system, comprising:
a user terminal configured to access the transaction server using an application installed in the user terminal or a web page provided by the transaction server, and request a transaction by transmitting user information;
a transaction server configured to receive the transaction request transmitted from the user terminal, generate a transaction server_authentication code by hashing <phone number, international mobile equipment identity (IMEI), time> bit string, and request authentication for the user terminal by transmitting the generated transaction server_authentication code to the authentication terminal;
an authentication terminal configured to generate a modified authentication code by hashing the <phone number, IMEI, time> bit string based on an authentication terminal_authentication code, when the generated transaction server_authentication code transmitted from the transaction server is matched with a pre-stored authentication terminal_authentication code, and request a verification code by transmitting the generated modified authentication code to the transaction server; and
an authentication processor configured to extract biometric information included in the modified authentication code received from the authentication terminal, generate the verification code by XORing a result of hashing <phone number, IMEI, time, authentication processor ID> with a shared secret key based on the modified authentication code, when the extracted biometric information is matched with pre-stored biometric information and activity information of the user, and transmit the generated verification code to the authentication terminal,
wherein the authentication terminal generates the shared secret key by multiplying a public key of the authentication processor with a private key of the authentication terminal, generates a modified verification code by XORing the result of hashing <phone number, IMEI, time, authentication processor ID> with the generated shared secret key, and transmits the generated modified verification code to the transaction server, and
wherein the transaction server generates a shared secret key by multiplying the public key received from the authentication terminal with a private key of the transaction server, compares a result of XORing the shared secret key and the modified verification code received from the authentication terminal with the result of hashing <phone number, IMEI, time, authentication processor ID> included in the authentication code stored in the transaction server, and notifies a transaction processing if the compared results match.

2. The authentication system of claim 1, wherein the user terminal transmits a message comprising a transaction type and a telephone number of the user to the transaction server.

3. The authentication system of claim 2, wherein the transaction server selects a random number, generates a public key using the random number, generates the transaction server_authentication code using the user information, and transmits the generated public key and the transaction server_authentication code to the authentication terminal.

4. The authentication system of claim 1, wherein the authentication terminal selects a random number, generates the public key using the random number, and transmits the generated public key and the modified authentication code to the authentication processor.

5. The authentication system of claim 1, wherein the authentication processor stores a normal fingerprint and an emergency fingerprint.

6. The authentication system of claim 4, wherein the authentication processor selects a random number, generates the shared secret key using the selected random number and the public key received from the authentication terminal, and transmits the generated public key to the authentication terminal.

7. The authentication system of claim 6, wherein the authentication terminal determines whether a result of calculation between the generated shared secret key and the modified verification code received from the authentication processor matches the verification code generated by using the user information.

8. The authentication system of claim 7, wherein the authentication terminal generates the shared secret key using the random number generated by the authentication terminal and a public key received from the transaction server, and transmits the public key the generated shared secret key to the transaction server.

9. The authentication system of claim 8, wherein the transaction server generates the shared secret key using the random number generated by the transaction server and the public key received from the authentication terminal.

10. An authentication method performed by an authentication system comprising a user terminal, a transaction server, an authentication terminal, and an authentication processor, the authentication method comprising:
by the user terminal, accessing the transaction server using an application installed in the user terminal or a web page provided by the transaction server, and requesting a transaction by transmitting user information;
by the transaction server receiving the transaction request transmitted from the user terminal, generating a transaction server_authentication code by hashing <phone number, international mobile equipment identity (IMEI), time> bit string, and requesting authentication for the user terminal by transmitting the generated transaction server_authentication code to the authentication terminal;
by the authentication terminal, generating a modified authentication code by hashing the <phone number, IMEI, time> bit string based on an authentication terminal_authentication code, when the generated transaction server_authentication code transmitted from the transaction server is matched with a pre-stored authentication terminal_authentication code, and requesting a verification code by transmitting the generated modified authentication code to the transaction server; and
by the authentication processor, verifying legitimacy of the authentication terminal, generating a verification code based on the modified authentication code extracting biometric information included in the modified authentication code received from the authentication terminal, generating the verification code by XORing a result of hashing <phone number, IMEI, time, authentication processor ID> with a shared secret key based on the modified authentication code, when the extracted biometric information is matched with pre-stored biometric information and activity information of the user, and transmitting the generated verification code to the authentication terminal, wherein the authentication terminal generates the shared secret key by multiplying a public key of the authentication processor with a private key of the authentication terminal, generates a modified verification code by XORing the result of hashing <phone number, IMEI, time, authentication processor ID> with the generated shared secret key, and transmits the generated modified verification code to the transaction server, and wherein the transaction server generates a shared secret key by multiplying the public key received from the authentication terminal with a private key of the transaction server, compares a result of XORing the shared secret key and the modified verification code received from the authentication terminal with the result of hashing <phone number, IMEI, time, authentication processor ID> included in the authentication code stored in the transaction server, and notifies a transaction processing if the compared results match.

11. The authentication method of claim 10, wherein the user terminal transmits a message comprising a transaction type and a telephone number of the user to the transaction server.

12. The authentication method of claim 11, wherein the transaction server selects a random number, generates a public key using the random number, generates the transaction server_authentication code using the user information, and transmits the generated public key and the transaction server_authentication code to the authentication terminal.

13. The authentication method of claim 10, wherein the authentication terminal selects a random number, generates the public key using the random number, and transmits the generated public key to the authentication processor.

14. The authentication method of claim 10, wherein the authentication processor stores a normal fingerprint and an emergency fingerprint.

15. The authentication method of claim 13, wherein the authentication processor selects a random number, generates the shared secret key using the selected random number and the public key received from the authentication terminal, and transmits the generated public key to the authentication terminal.

16. The authentication method of claim 15, wherein the authentication terminal determines whether a result of calculation between the generated shared secret key and the modified verification code received from the authentication processor matches the verification code generated by using the user information.

17. The authentication method of claim 16, wherein the authentication terminal generates the shared secret key using the random number generated by the authentication terminal and a public key received from the transaction server, and transmits key the generated shared secret key to the transaction server.

18. The authentication method of claim 17, wherein the transaction server generates the shared secret key using the random number generated by the transaction server and the public key received from the authentication terminal.

* * * * *